(12) United States Patent
Terracino et al.

(10) Patent No.: US 9,044,917 B1
(45) Date of Patent: Jun. 2, 2015

(54) NON-SKID PROTECTIVE CLOTH OR PAD

(71) Applicants: Bradie Terracino, Virginia Beach, VA (US); Robert Terracino, Virginia Beach, VA (US)

(72) Inventors: Bradie Terracino, Virginia Beach, VA (US); Robert Terracino, Virginia Beach, VA (US)

( * ) Notice: Subject to any disclaimer, the term of this patent is extended or adjusted under 35 U.S.C. 154(b) by 0 days.

(21) Appl. No.: 14/044,130

(22) Filed: Oct. 2, 2013

Related U.S. Application Data

(63) Continuation-in-part of application No. 12/460,763, filed on Jul. 27, 2009, now abandoned.

(51) Int. Cl.
| | |
|---|---|
| *B32B 9/00* | (2006.01) |
| *D06N 7/00* | (2006.01) |
| *B32B 3/00* | (2006.01) |
| *B32B 3/30* | (2006.01) |
| *B32B 5/02* | (2006.01) |
| *B32B 7/04* | (2006.01) |

(52) U.S. Cl.
CPC . *B32B 3/30* (2013.01); *B32B 5/024* (2013.01); *B32B 7/04* (2013.01)

(58) Field of Classification Search
CPC ............. B32B 27/20–27/32; D03D 15/00
USPC .......... 442/181–303; 428/100, 102, 120, 172, 428/179, 141–155
See application file for complete search history.

(56) References Cited

U.S. PATENT DOCUMENTS

| | | | | | |
|---|---|---|---|---|---|
| 2,274,468 | A | * | 2/1942 | Bell | 112/421 |
| 3,565,661 | A | * | 2/1971 | Harrison | 428/172 |
| 3,627,566 | A | * | 12/1971 | Stichter et al. | 428/95 |
| 5,567,497 | A | * | 10/1996 | Zegler et al. | 428/95 |
| 6,162,748 | A | * | 12/2000 | Schilling et al. | 442/226 |
| 2009/0220797 | A1 | * | 9/2009 | Tresino | 428/421 |

OTHER PUBLICATIONS

PolyOne's Geon Plastisol coatings, 2010.*
Test Report No: 3235547PP02R3, Static Coefficient of Friction (Slide Angle Method), TAPPI T548.
Test Report No: 3235547PP01R2, Static Coefficient of Friction (Horizontal Pull Method) ASTM C1028-07.

* cited by examiner

*Primary Examiner* — Jennifer Chriss
*Assistant Examiner* — Ricardo E Lopez
(74) *Attorney, Agent, or Firm* — William G. Sykes

(57) ABSTRACT

A two-layer, non-skid protective cloth or pad for use as a painter's drop cloth or as a protective pad for surfaces such as boat decks, airplane wings or other surfaces where a non-skid pad is essential. The pad has a woven upper member, typically of a cotton canvas-like material, and a lower, resilient member. The two layers are typically stitched together. The lower, resilient member typically comprises downward-projecting bumps, often of two or more different sizes. The bumps are joined by a grid of resilient material. Bumps may be formed from a foamed thermoset plastic resin. In alternate embodiments, an impervious member may be inserted between the upper and lower members. The non-skid protective cloth or pad has a Sliding Coefficient of Friction greater than 0.75 and an average Slide Angle no less than approximately 40° measured in accordance with TAPPI T548 specification.

10 Claims, 6 Drawing Sheets

Static Coefficient of Friction (Slide Angle Method) TAPPI T548

| Specimen | Slide Angle (in Degrees) | Static Coefficient of Friction |
|---|---|---|
| 1 | 39.8 | 0.8 |
| 2 | 50.7 | 1.2 |
| 3 | 43.1 | 0.9 |
| 4 | 39.8 | 0.8 |
| 5 | 42.4 | 0.9 |
| Avg. | 43.2 | 0.9 |

Notes: Sample ID: Painters Drop Cloth and Pad
Surface Tested Against: Laminated Wood Flooring
Lab Environment: Temperature 23° C, Humidity 50%
Specimen Conditioning: 24 hours minimum

Fig. 5

Static Coefficient of Friction (ASTM C1028-07)

| Specimen | Pull Force | |
|---|---|---|
| | Dry | Wet |
| 1 | 40.0 | 36.0 |
| 2 | 39.7 | 33.1 |
| 3 | 39.5 | 34.7 |
| 4 | 40.3 | 35.5 |
| 5 | 39.4 | 34.4 |
| 6 | 40.0 | 36.0 |
| 7 | 40.3 | 38.8 |
| 8 | 40.1 | 39.4 |
| 9 | 38.9 | 37.5 |
| 10 | 39.6 | 37.3 |
| 11 | 39.3 | 35.6 |
| 12 | 41.8 | 36.1 |
| Avg. Static Coefficient of Friction | 0.814 | 0.589 |
| Requirement (min) | 0.5 | |

Notes: Sample ID: Painters Drop Cloth and Pad
Surface Tested Against: Laminated Wood Flooring
Neolite Sled Weight: 56 lbs
Lab Environment: Temperature 23° C, Humidity 50%
Specimen Conditioning: 24 hours minimum

Fig. 6

NON-SKID PROTECTIVE CLOTH OR PAD

RELATED APPLICATIONS

This application is a Continuation-in-Part of U.S. patent application Ser. No. 12/460,763 filed Jul. 27, 2009 for NON-SKID PROTECTIVE CLOTH OR PAD that is incorporated herein in its entirety by reference.

FIELD OF THE INVENTION

The invention pertains to protective cloths or pads and, more particularly, to a protective cloth or pad that has a non-skid backing to hold the cloth or pad in position during use.

BACKGROUND OF THE INVENTION

Protective cloths and pads are well known and widely used. Such items range from simple thin polyethylene sheets used to protect surfaces during painting or similar operations to woven fabric (e.g., canvas) drop cloths to quilted protective pads used by furniture movers and the like. For simplicity, the term drop cloth as used herein refers to any and all such cloths and pads, regardless of material or construction.

In a typical use, drop cloths are placed on floors to provide protection. A common and serious problem is that frequently the drop cloths of the prior art may slip and slide relative to the floor upon which they are laid. Such slippage may range from a mild annoyance to a serious safety hazard when a drop cloth is placed upon a level floor. However, once such a drop cloth is used on a surface other than a level floor, the consequences of such slippage become much more serious. For example, drop cloths are commonly used to protect stairs. If the drop cloth slips, it is not uncommon for a person ascending or descending the stairs to slip and potentially tumble to the bottom of the stairs. Serious injuries frequently result from such a fall.

DISCUSSION OF THE RELATED ART

Several attempts have been made in the prior art to provide a non-slip surface for drop cloths and the like. For example, U.S. Pat. No. 152,451 for IMPROVEMENT IN WATERPROOF FABRICS, issued Jun. 30, 1874 to George M. Allerton discloses a woven woolen cloth having one surface covered with a rubber film.

U.S. Pat. No. 1,728,545 for LINEMAN'S BLANKET, issued Sep. 17, 1929 to Fred L. Haushalter provides a dielectric structure formed by a rubber insulating sheet and a fabric backing sheet to prevent stretching of the rubber.

U.S. Pat. No. 1,928,943 for MATTRESS PROTECTOR, issued Oct. 3, 1933 to John L. McKay teaches a waterproof sheet having eyelets disposed near its corners. Loops attached to the eyelets are used to secure the mattress protector, thereby preventing the slipping of the mattress protector on the mattress it is protecting.

U.S. Pat. No. 2,274,468 for FLOOR COVERING issued Feb. 24, 1942 to Harry W. Bell provides an improved type of floor mat. It is an object of this invention to provide a floor mat which affords a high degree of traction.

U.S. Pat. No. 3,488,684 for FLOOR COVERING issued Jan. 6, 1970 to John C. Wrightson shows a quilted, three-layer construction having a non-skid bottom layer for use as decorative rug.

U.S. Pat. No. 3,565,661 for FLOOR COVERINGS AND THE LIKE issued Feb. 23, 1971 to Alan Morley Harrison shows an improved floor covering and a process for making the same. A base material in sheet form having a coating of a thermoplastic material such as polyvinyl chloride impregnated with an abrasive substance in grit form. A second coating of a thermoplastic material is preferably applied over the first coating also containing an abrasive in grit form to which silicon carbide is sprinkled thereover. The tread surface of the floor covering is embossed to provide small indentations therein.

U.S. Pat. No. 5,567,497 for SKID-RESISTANT FLOOR COVERING AND METHOD OF MAKING SAME issued Oct. 22, 1996 to Stephen A. Zegler et al. provides a floor covering comprising a floor covering face layer having a thermoplastic lower backing layer and a thermoplastic contact layer that is fusibly compatible with the lower backing layer is disclosed. The upper surface of the contact layer is fused to the lower backing layer and the lower surface of the contact layer includes a plurality of shallow thermoplastic projections which extend away from the floor covering face layer and which are sufficiently elastic to impart skid resistance to the floor covering.

U.S. Pat. No. 6,093,469 for MAT AND METHOD OF MAKING MAT issued Jul. 25, 2000 to Michael T. Callas discloses an entrance mat having a polypropylene greige fiber pad with a trimmed outer peripheral edge and a backing of non-skid plastic material. The backing has longitudinal treads having high friction and tacky properties which prevent creep and folding of the pad on a floor. An edge has a non-skid web secured with an adhesive to the backing and a lip extended over the adhesively secured to the trimmed outer peripheral edge.

U.S. Pat. No. 6,296,919 for CUSHIONED CARPETED FLOOR MAT WITH A LEAST ONE CUSHIONING INTEGRATED RUBBER PROTRUSION issued Oct. 2, 2001 to James N. Rockwell, Jr., et al. provides a cushioned floor covering article wherein the mat includes a tufted carpet placed on the top side of a foam rubber sheet and at least one foam rubber protrusion integrated within at least a portion of the bottom side of the foam rubber sheet. Such an article provides effective removal of moisture, dirt, and debris from the footwear of pedestrians through the utilization of a carpet pile component. Furthermore, the utilization of a foam rubber backing also allows for either periodic heavy duty industrial-scale laundering in such standard washing machines or periodic washing and drying in standard in-home machines, both without appreciably damaging the inventive floor covering article, such as a floor mat.

U.S. Pat. No. 6,610,382 for FRICTION CONTROL ARTICLE FOR WET AND DRY APPLICATIONS issued Aug. 26, 2003 to James J. Kobe et al. teaches a friction control article including a backing layer having a first surface with an array of at least 100 upstanding stems per square inch and a second surface. At least a portion of the upstanding stems is an elastomeric material and the stems have an aspect ratio of at least 1.25. The first surface has a static coefficient of friction when dry of at least 0.6 and a static coefficient of friction when wet within 20% of the static coefficient of friction when dry. The first surface has a peel strength and a tensile strength of substantially zero when engaged with another slip control article. The first surface has relatively high shear strength when engaged with another slip control article. The high shear forces are due primarily to the frictional properties of the elastomeric materials, not a mechanical interlock of the stems, such as on a mechanical fastener.

Published United States Patent Application No. 2001/0002615 for PROTECTIVE COVER SYSTEM, published Jun. 7, 2001 upon application by Reginald Michael Lacross et al. discloses a covering system in which a cover constructed of a flexible sheet material is suitable for placement on a floor between a door frame and a room.

U.S. Pat. No. 6,911,407 for NON-SLIP ABSORBENT ARTICLE issued Jun. 28, 2005 to Earle H. Sherrod et al. shows a multi-layer absorbent article suitable for use as a bed pad, a baby changing pad, a table cloth, etc. A non-adhesive, skid-resistant coating is applied to the bottom layer of the article.

U.S. Pat. No. 6,946,163 for SLIP RESISTANT MAT issued Sep. 20, 2005 to Ian S. Malpass et al. teaches a slip resistant floor mat composed of one or more layers of material the bottom layer of which incorporates a plurality of recessions with inset suction cups in the bottom surface of the bottom.

U.S. Pat. Nos. 6,961,969, 7,069,607, and 7,137,157, each for ABSORBENT TOWEL WITH PROJECTIONS, issued Nov. 8, 2005, Jul. 4, 2006, and Nov. 21, 2006, respectively, to Susan Nichols each provide a towel having a base layer with raised projections to provide a higher coefficient of static friction relative to an external surface relative to other bottom surfaces common in the prior art.

United States Published Patent Application No. 2006/0162073 for ABSORBENT TOWEL WITH PROJECTIONS, published Jul. 27, 2006 upon application by Susan Nichols shows a towel having a base layer with raised projections to provide a higher coefficient of static friction relative to an external surface relative to other bottom surfaces common in the prior art.

United States Published Patent Application No. 2007/0220673 for CLOTHING ARTICLES HAVING RAISED PROJECTIONS, published Sep. 27, 2007 upon application by Susan Nichols shows a towel having a base layer with raised projections to provide a higher coefficient of static friction than the base layer relative to an external surface.

United States Published Patent Application No. 2007/0275209 for NON-SKID DROP CLOTH, published Nov. 29, 2007 upon application by Anal Netravali et al. discloses a single layer plastic sheet having raised dimples on one or both sides.

United States Published Patent Application No. 2008/0131680 for ABSORBENT NON-SKID DROP CLOTH, published Jun. 5, 2008 upon application by Richard James Bliton et al. teaches a multi-layer article having a lofted, non-woven layer and a non-skid barrier layer bonded thereto.

United States Published Patent Application No. 2009/0068431 for ONE-SIDED TACKY POLYOLEFIN FILM, published Mar. 12, 2009 upon application by Martin F. Hoenigmann provides a plastic sheet with a tacky surface designed to prevent slippage of the sheet None of the patents and published patent applications, taken singly, or in any combination are seen to teach or suggest the novel non-skid protective cloth or pad of the present invention.

SUMMARY OF THE INVENTION

In accordance with the present invention there is provided a two-layer, non-skid protective pad for use as a painter's drop cloth or as a protective pad for surfaces such as boat decks, airplane wings or other surfaces where a non-skid, protective pad is essential. The pad has a woven upper member, typically of a cotton canvas-like material, and a lower, resilient member. The two layers are typically stitched together. The lower, resilient member typically comprises downward-projecting, spherical, quasi-spherical, and/or amorphous protrusions often of two or more different sizes and/or diameters. The term "bump" is used herein to refer to such spherical, quasi-spherical, and/or amorphous protrusions. The bumps are joined by a grid of resilient material. In alternate embodiments, an impervious member may be inserted between the upper and lower members.

As the terms "non-skid" or "skid resistant" applied to articles used in trade convey little if any information regarding the performance of an article bearing such a label. Consequently, a potential user of a protective cloth or pad has no way of knowing how a particular cloth or pad so labeled will perform in a particular application and/or environment.

The novel structure of the non-skid cloth or pad of the present invention has been tested to determine a Static Coefficient of Friction in accordance with the TAPPI T-548 standard and a static and Kinetic Coefficient of Friction by Horizontal Plane in accordance with the ASTM C1028-07 standard. This testing is discussed in detail hereinbelow. The acronym "TAPPI" stands for Technical Association of the Pulp and Paper Industry. While the novel non-skid drop cloth of the present invention is not a "paper" product, it is an extremely flexible and substrate-hugging sheet. Consequently, tests, specifically TAPPI T548 and ASTM C1028-07 are suitable and effective tests for determining the Coefficient of Friction of the novel non-skid drop cloth of the invention.

It is, therefore, an object of the invention to provide a protective cloth or pad that includes a resilient, non-skid surface to prevent movement of the cloth or pad on the surface upon which it is placed.

It is another object of the invention to provide a protective cloth or pad which is conformable to irregular surfaces such as stairs and remains in position once placed thereupon.

It is an additional object of the invention to provide a protective cloth or pad that has a resilient lower member having a grid of downward protruding, interconnected bumps.

It is a further object of the invention to provide a protective cloth or pad that utilizes materials wherein Van Der Walls forces help provide the desired frictional characteristics.

It is yet another object of the invention to provide a protective cloth or pad that utilizes hydrophobic thermoset resin plastic materials.

It is an additional object of this invention wherein the "bumps" are formed from hydrophobic materials.

It is a further object of the invention to provide a protective cloth or pad having a woven fabric upper member.

It is a still further object of the invention to provide a protective cloth or pad that, optionally, may contain an interposed impervious member.

It is an additional object of the invention to provide a protective cloth or pad having a Static Coefficient of Friction greater than approximately 0.75 measured in accordance with TAPPI T548 (Slide Angle method).

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein:

FIG. 5 is a table of results measured by testing samples of the non-skid drop cloth of the present invention using the apparatus of FIG. 4 to perform a Coefficient of Friction test in accordance with the TAPPI T-548 standard; and FIG. 6 is a table of Coefficient of Friction results measured by testing samples of the non-skid drop cloth of the present invention in accordance with the ASTM C-1028-07 standard.

DETAILED DESCRIPTION OF THE PREFERRED EMBODIMENT

The present invention provides non-skid protective cloth or pad for a variety of applications.

Figure 1:
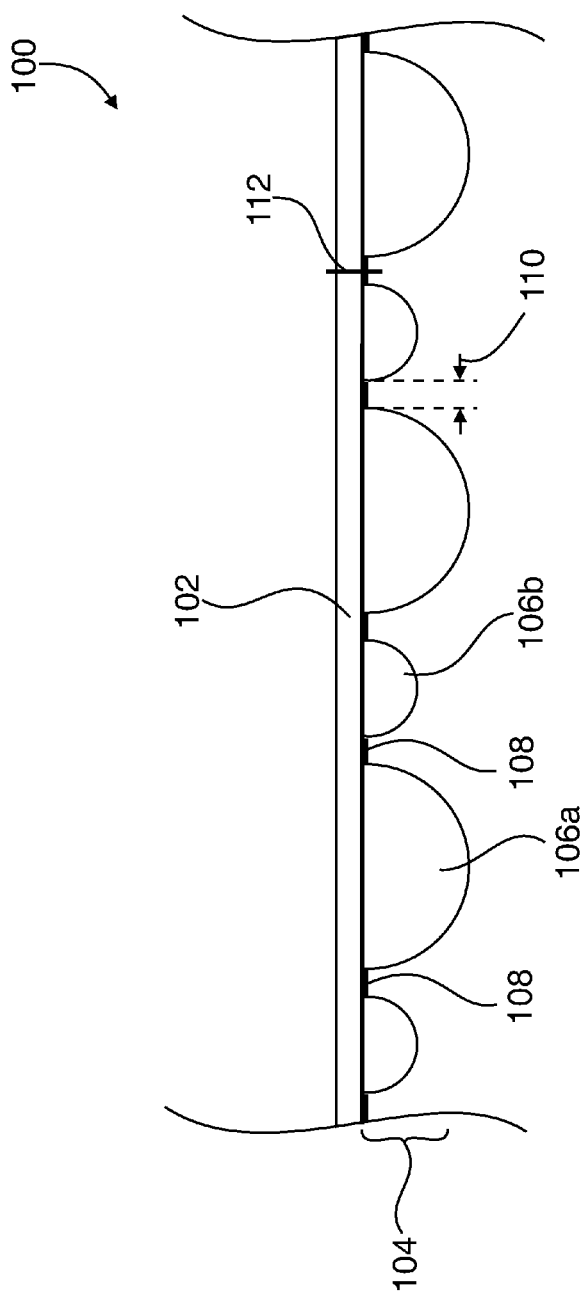
FIG. 1 is a side, elevational, cross-sectional, schematic view of a portion of the non-skid protective cloth or pad in accordance with the invention.

Referring first to FIG. 1, there is shown a side, elevational, cross-sectional, schematic view of a portion of the non-skid protective cloth or pad in accordance with the invention, generally at reference number 100.

Non-skid protective cloth or pad 100 has two layers—a woven upper layer 102 and a lower, resilient layer 104. Woven upper layer 102 is typically an absorbent, woven cotton material such as canvas or another canvas-like material. For purposes of disclosure, an 8-ounce material has been chosen. Canvas may be treated with a waterproofing material, if desired. Such a treatment, however, renders the upper woven layer 102 non-absorbent which may impair the function of upper woven layer 102 to absorb paint or other material spilled thereupon. It will, however, be recognized by those of skill in the art that other weight materials may be chosen depending upon the desired application in which non-skid protective cloth or pad 100 is to be utilized. It will further be recognized that woven materials other than cotton may be selected to meet a particular operating circumstance or environment. Consequently, the invention is not limited to the 8-ounce canvas chosen for purposes of disclosure. Rather the invention covers any suitable material and weight.

A lower, resilient layer 104 is bonded to woven upper layer 102, typically by stitching 112. It will be recognized that methods and/or materials other than stitching may be utilized to secure upper woven layer 102 to lower, resilient layer 104. Some possible choices include, but are not limited to adhesive fastening, hook-and-loop fasteners, mechanical fasteners, etc. A "mechanical" fastening method (e.g., stitching, etc.) rather than a chemical, thermal fusing, or any other type of bonding is shown. However, it will be recognized that a non-mechanical method of fastening lower, resilient layer 104 to woven upper layer 102 may be desirable to meet a specific operating circumstance or environment.

Figure 2:
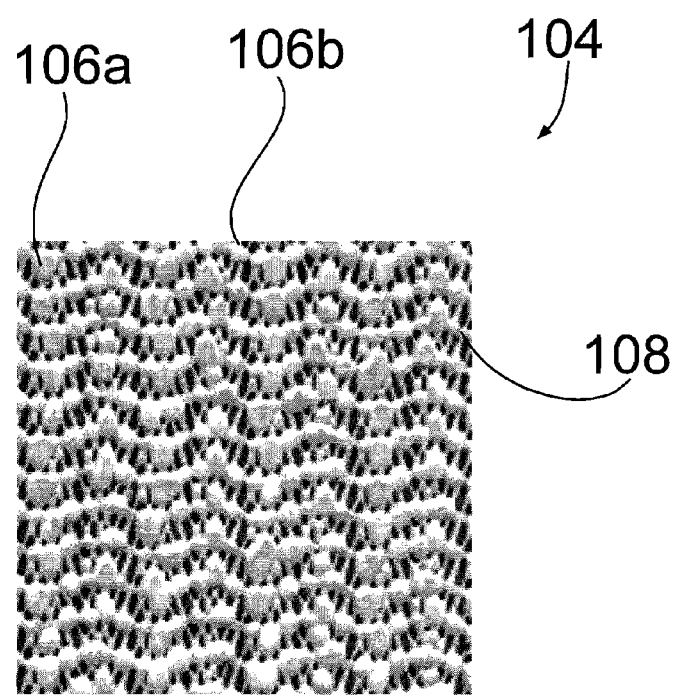
FIG. 2 is a bottom plan view of the resilient layer of the non-skid protective cloth or pad of FIG. 1.

Referring now also to FIG. 2, lower resilient layer 104 has a plurality of downward-projecting bumps 106a, 106b. Bumps 106a are typically larger in circumference than bumps 106b. As shown in FIG. 1, larger bumps 106a are shown having a greater height than smaller bumps 106b. In alternate embodiments, larger and smaller bumps 106a and 106b, respectively, may have a substantially identical height. In still other embodiments, smaller bumps 106b may have a height larger than larger bumps 106a.

Bumps 106a, 106b are interconnected by resilient web segments 108. An inter-bump space 110 remains between bumps. As seen in FIG. 1, inter-bump space is shown schematically to be between a larger bump 106a and a smaller bump 106b. However, inter-bump space 110 may be between any two larger bumps 106a or between any two smaller bumps 106b as well as between larger bump 106a and smaller bump 106b as shown for purposes of disclosure.

Bumps 106a, 106b may be formed from of a foamed thermoset plastic resin. When the bumps 106a, 106b are compressed by an object or a person standing on non-skid protective cloth or pad 100, the grip or friction on either wet or dry surfaces is exceptional. This gripping is caused by the compressed areas spreading under the load, and therefore having greater contact surface with the substrate and, consequently, producing higher Van Der Waals forces to keep the non-skid protective drop or pad stationary.

In operation, non-skid protective cloth or pad 100 is placed on a surface to be protected, not shown, resilient layer 104 towards the surface. Bumps 106a, 106b grip the surface, especially when compressed by the weight of a person, not shown, directly over a particular portion of non-skid protective cloth or pad 100.

One exemplary use of non-skid protective cloth or pad 100 is to protect a surface from paint, varnish, stain, etc. The choice of material for upper woven layer 102 allows paint or other material to be at least partially absorbed by the layer. Canvas is a typical material selected for upper woven layer 102. Unlike impervious drop cloths (i.e., thin plastic sheets), the partially absorbed paint is typically less prone to tracking by a person stepping in the spilled paint than is paint spilled on a non-absorbing cloth of the prior art. In addition, non-skid protective cloth or pad 100 may be laundered to remove soluble paint or other materials.

Non-skid protective cloth or pad 100 may also be utilized to protect a delicate surface from being scratched or marred. One environment where non-skid protective cloth or pad 100 is particularly useful is on a set of stairs. Once positioned, non-skid protective cloth or pad 100 remains in place, thereby providing a safe, stable surface on the stairs as workmen ascend and descend the stairs. It will be recognized that the choice of materials, weights, thicknesses, etc will determine the overall flexibility of non-skid protective cloth or pad 100 for applications such as stairs.

An example of the use of non-skid protective cloth or pad 100 as a protective pad, maintenance routines periodically require mechanics to walk on the upper surface of an airplane wing. The use of non-skid protective cloth or pad 100 on the wing not only protects the delicate wing surface but provides a much more secure surface upon which the mechanic may walk or stand. Even though the surface of the wing is typically curved, the novel construction of non-skid protective cloth or pad 100 greatly improves the security of the mechanic.

Another exemplary use of non-skid protective cloth or pad 100 is to protect delicate surfaces of boat decks in an environment where they frequently become wet and slippery. Non-skid protective cloth or pad 100 remains in place on the deck, even wet, and provides a non-slip upper surface (i.e., the upper surface of upper woven layer 102) upon which boat passengers may walk. Because non-skid protective cloth or pad 100 typically lacks an impermeable membrane, air may flow though non-skid protective cloth or pad 100, thereby allowing the cloth and the surface therebelow to dry.

Figure 3:
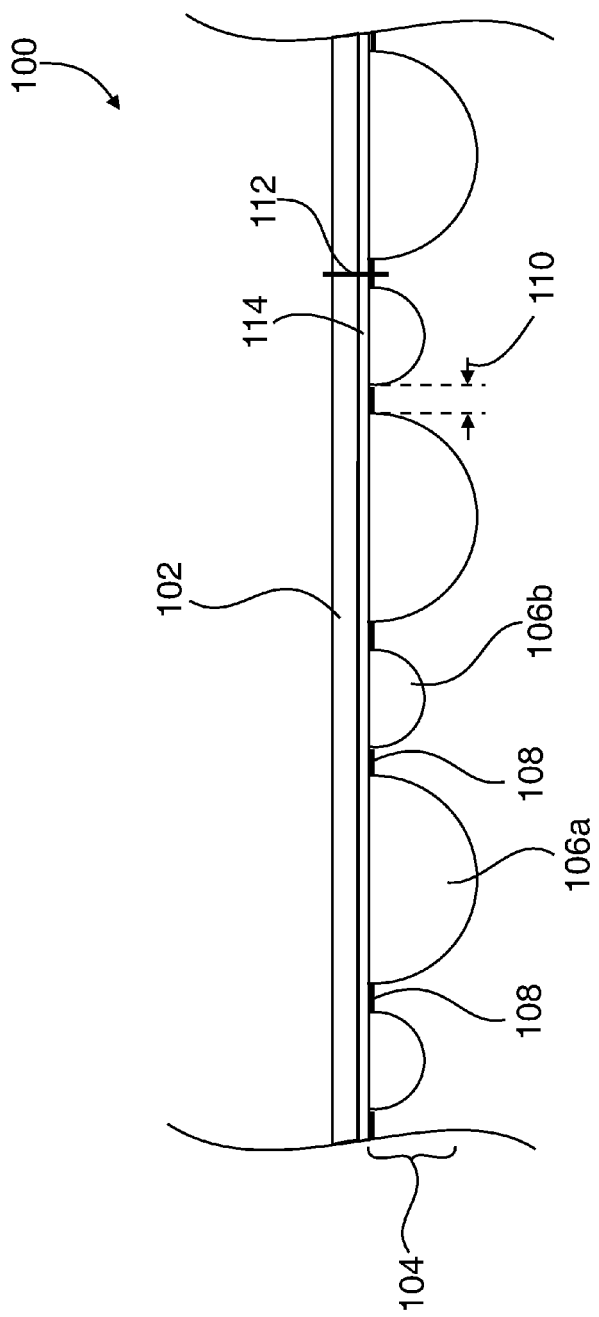
FIG. 3 is a side elevational, cross-sectional, schematic view of the non-skid protective cloth or pad of FIG. 1 but containing an interposed impervious layer.

In an alternate embodiment, a third layer, typically an impermeable layer 114 may be interposed between woven upper layer 102 and resilient layer 104. This is shown in FIG. 3.

To quantify the slip resistance of non-skid protective cloth or pad 100, Coefficient of Friction Slide Angle Testing was performed by SGS North America, Consumer Testing Services, 291 Fairfield Avenue, Fairfield, N.J., USA. The results of the testing were reported in Test Report No.

3235547PP02R3 dated Sep. 9, 2013. Five samples of non-skid protective cloth or pad 100 were submitted and tested in accordance with the TAPPI T548 test procedures.

Figure 4:
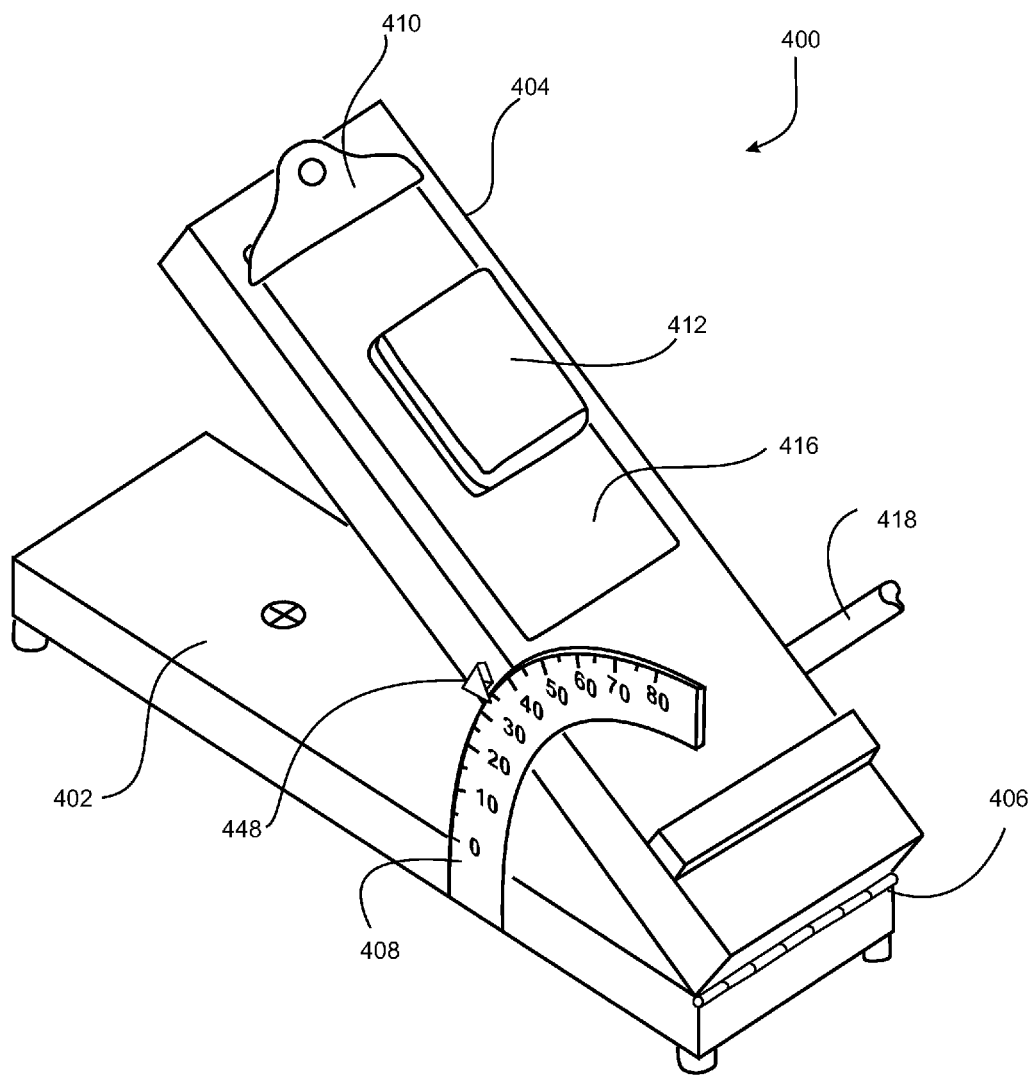
FIG. 4 is a perspective, schematic view of a slide angle testing apparatus for performing Coefficient of Friction testing in accordance with the TAPPI T548 standard.

Referring now also to FIG. 4 there is shown a perspective, schematic view of a slide angle testing apparatus for performing Coefficient of Friction Testing in accordance with the TAPPI T548 standard, generally at reference number 400.

Tester 400 has a flat base portion 402 and an elevatable portion 404 hingedly attached to flat base portion 402 by a hinge 406.

A protractor scale 408 is affixed to flat base portion 402 so as to measure the inclination of elevatable portion 404 relative to flat base portion 402. An indicator 414 is attached to elevatable portion 404 to provide an exact indication on protractor scale 408.

A clamp 410 is provided to selectively secure a sample of a first material for testing 416 against an upper surface of elevatable upper portion 404.

A sample 412 of the second material being tested is placed on an upper surface of the sample of the first material 416.

A typical test is begun with elevatable upper portion 404 in a lowered position flat against base portion 402. In other words, elevatable upper portion is at a zero degree elevation.

A "smooth drive system" (i.e., a drive system that introduces minimum vibration, jerkiness, etc.), not shown, activated through shaft 418 is used to slowly elevate upper elevatable portion 404 until sample 412 slides along sample 416. It important that the smooth drive system not impart vibration to the apparatus that could introduce inaccuracy into the test results.

Referring now also to FIG. 5, there are shown test results for tests of novel drop cloth 100 (i.e., non-skid protective cloth or pad), sample 412 sliding on a sample of laminate wood flooring (i.e., sample 416).

As may readily be seen, five specimens (i.e., samples) were tested in accordance with the TAPPI T548 test procedure. Column 430 shows the angle (i.e., the inclination of elevatable upper portion 404) at which sample 412 slides along sample 416.

A Static Coefficient of Friction may readily be calculated from the side angle measured for a particular specimen. These Static Coefficient of Friction values are enumerated in column 432.

Averages 436, 438 are calculated for slide angles and Static Coefficient of Friction, respectively.

It will be noted that testing was performed with a lab environmental temperature and humidity of 23° C. and 50% relative humidity, reference number 440. Specimens were acclimated for 24 hours minimum prior to testing.

These test results showed an average slide angle of approximately 43 degrees and an average Static Coefficient of Friction of approximately 0.9 when non-skid protective cloth or pad 100 is tested on a laminate flooring sample. Laminate flooring was estimated to represent the most "slippery" surface upon which a painter's drop cloth might be utilized.

Samples of novel drop cloth 100 were also tested using a horizontal dynamometer pull tester in accordance with the ASTM C1028-07 test procedure. The results of this test are shown in FIG. 6.

As may readily be seen, twelve specimens (i.e., samples) 450 were tested in accordance with the ASTM C1028-07 specification. Column 452 shows the angle the measured Static Coefficient of Friction measured with dry samples while column 454 shoes the Static Coefficient of Friction measures with wet samples.

The average Static Coefficient of Friction for dry samples, 456, was 0.814. Likewise, the average Coefficient of Static Friction for wet samples, 458, was 0.589. Both average Coefficients 456 and 458 exceeded the Coefficient of Friction value of 0.5 as required in OSHA proposed rules for "Walking and Working Surfaces; Personal Protective Equipment (Fall Protection Systems)" as published in the Federal Register 68:23527-23568, Section 1910.22 General Requirements, Section 2. *Slip-resistance.*

"A reasonable measure of slip-resistance is static coefficient of friction (COF). A COF of 0.5, which is based upon studies by the University of Michigan and reported in "Work Surface Friction: Definitions, Laboratory and Field Measurements, and a Comprehensive Bibliography," is recommended as a guide to achieve proper slip-resistance. A COF of 0.5 is not intended to be an absolute standard value. A higher COF may be necessary for certain work tasks, such as carrying objects, pushing or pulling objects, or walking up or down ramps."

As seen in Notes 462, that testing was performed with a lab environmental temperature and humidity of 23° C. and 50% relative humidity. Specimens were acclimated for 24 hours minimum prior to testing. The Neolite Sled Weight was 56 pounds.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A non-skid protective cloth or pad, consisting of:
   a) a single, absorbent, plain woven upper layer free from any projecting cut pile and having an upper and a lower major surface;
   b) a single lower, resilient layer having an upper and a lower major surface, said upper major surface of said single lower resilient layer being disposed adjacent said lower layer of said single, absorbent, woven upper layer, said lower resilient layer comprising a network of downward projecting bumps interconnected one to another by a resilient grid, said downward projecting bumps comprising bumps having at least two different circumferential sizes, said downward projecting bumps each having a height, said height of bumps having the smaller of said at least two different circumferential sizes being greater than said height of bumps having said larger of said at least two circumferential sizes; and
   c) stitching disposed through both said single, absorbent, upper, woven layer and said single lower resilient layer;
   whereby when said lower major surface of said single lower resilient layer is placed on a support surface, a Sliding Coefficient of Friction measured in accordance with TAPPI T548 specification is greater than approximately 0.75.

2. The non-skid protective cloth or pad as recited in claim 1, wherein said single, absorbent, woven, upper layer comprises a plain woven cotton fabric.

3. The non-skid protective cloth or pad as recited in claim 1, wherein said single, absorbent, woven, upper layer comprises canvas.

4. The non-skid protective cloth or pad as recited in claim 1, wherein said downward projecting bumps comprise a shape selected from the group: spherical, quasi-spherical, and amorphous.

5. The non-skid protective cloth or pad as recited in claim 1, wherein said downward projecting bumps are separated one from another by an inter-bump space.

6. A non-skid protective cloth or pad, consisting of:
   a) a single, absorbent, plain woven upper layer free from any projecting cut pile and having an upper and a lower major surface;
   b) a single lower, resilient layer having an upper and a lower major surface, said upper major surface of said single lower resilient layer being disposed adjacent said lower layer of said single, absorbent, woven upper layer, said lower major surface comprising said lower resilient layer comprising a network of downward projecting bumps interconnected one to another by a resilient grid, said downward projecting bumps comprising bumps having at least two different circumferential sizes, said downward projecting bumps each having a height, said height of bumps having the smaller of said at least two different circumferential sizes being greater than said height of bumps having said larger of said at least two circumferential sizes; and
   c) stitching disposed through both said single, absorbent, upper, woven layer and said single lower resilient layer;
   whereby when tested in accordance with TAPPI T548 specification, an average slide angle is no less than approximately 40°.

7. The non-skid protective cloth or pad as recited in claim 6, wherein said single, absorbent, woven, upper layer comprises a plain woven cotton fabric.

8. The non-skid protective cloth or pad as recited in claim 6, wherein said single, absorbent, woven, upper layer comprises canvas.

9. The non-skid protective cloth or pad as recited in claim 6, wherein said downward projecting bumps comprise a shape selected from the group: spherical, quasi-spherical, and amorphous.

10. The non-skid protective cloth or pad as recited in claim 6, wherein said downward projecting bumps are separated one from another by an interbump space.

* * * * *